United States Patent
Morishima et al.

(10) Patent No.: US 7,496,023 B2
(45) Date of Patent: Feb. 24, 2009

(54) METHOD, PROGRAM AND SYSTEM OF FORMING VISUAL IMAGE ON OPTICAL DISK

(75) Inventors: Morito Morishima, Fukuroi (JP); Akira Usui, Hamamatsu (JP); Yusuke Konagai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 767 days.

(21) Appl. No.: 10/712,577

(22) Filed: Nov. 12, 2003

(65) Prior Publication Data

US 2004/0095866 A1   May 20, 2004

(30) Foreign Application Priority Data

Nov. 15, 2002   (JP)   ............................. 2002-332720
Apr. 25, 2003   (JP)   ............................. 2003-122059

(51) Int. Cl.
    *G11B 7/0045* (2006.01)
(52) U.S. Cl. .................. 369/103; 369/275.3; 369/275.4
(58) Field of Classification Search ................. 369/103, 369/275.3, 275.4, 284, 283, 59.11, 59.24
See application file for complete search history.

(56) References Cited

U.S. PATENT DOCUMENTS

| | | | | |
|---|---|---|---|---|
| 5,608,717 A | * | 3/1997 | Ito et al. ................... | 369/275.3 |
| 5,608,718 A | * | 3/1997 | Schiewe ................... | 369/275.4 |
| 5,809,003 A | * | 9/1998 | Taira et al. ............... | 369/275.1 |
| 6,088,323 A | * | 7/2000 | Kobayashi et al. ........ | 369/275.3 |
| 6,259,666 B1 | * | 7/2001 | Kobayashi et al. ........ | 369/59.11 |
| 6,507,557 B1 | * | 1/2003 | Ohno et al. ............... | 369/275.3 |
| 2001/0026531 A1 | * | 10/2001 | Onodera et al. ............. | 369/284 |
| 2003/0108708 A1 | * | 6/2003 | Anderson et al. ........... | 428/64.4 |
| 2004/0125730 A1 | * | 7/2004 | Yamamoto ............... | 369/59.24 |

FOREIGN PATENT DOCUMENTS

| | | |
|---|---|---|
| EP | 0643391 | 3/1995 |
| EP | 1143426 | 10/2001 |
| EP | 1148484 | 10/2001 |
| JP | 2002074757 | 3/2002 |
| JP | 2004039029 A * | 2/2004 |

\* cited by examiner

*Primary Examiner*—Wayne Young
*Assistant Examiner*—Linh T. Nguyen
(74) *Attorney, Agent, or Firm*—Morrison & Foerster LLP

(57) ABSTRACT

A visible image forming method is performed for forming a visible image on an optical disk by an optical disk recording apparatus, which is designed for applying a laser beam onto an optical disk according to first recording data of a predetermined format to form pits having lengths specified by the first recording data. First, a generating step is performed for generating second recording data by embedding image formation data of a visible image in a part of a predetermined format which is the same as predetermined for the first recording data. Second, an extracting step is performed for extracting the image formation data of the visible image from the second recording data of the predetermined format. Then, a forming step is performed for forming pits in the optical disk according to the extracted image formation data so as to form the visible image on the optical disk.

57 Claims, 16 Drawing Sheets

| FRAME NO. | | | | | | | | |
|---|---|---|---|---|---|---|---|---|
| 1 | | | | S0 | | | | |
| 2 | | | | S1 | | | | |
| 3 | P1 | Q1 | R1 | S1 | T1 | U1 | V1 | W1 |
| 4 | P2 | Q2 | R2 | S2 | T2 | U2 | V2 | W2 |
| 5 | | | | · | | | | |
| 6 | | | | · | | | | |
| ⋮ | | | | · | | | | |
| 95 | P93 | Q93 | R93 | S93 | T93 | U93 | V93 | W93 |
| 96 | P94 | Q94 | R94 | S94 | T94 | U94 | V94 | W94 |
| 97 | P95 | Q95 | R95 | S95 | T95 | U95 | V95 | W95 |
| 98 | P96 | Q96 | R96 | S96 | T96 | U96 | V96 | W96 |
| 1 | | | | S0 | | | | |
| 2 | | | | S1 | | | | |
| ⋮ | P1 | Q1 | R1 | S1 | T1 | U1 | V1 | W1 |
| | P2 | Q2 | R2 | S2 | T2 | U2 | V2 | W2 | one SUB CODING FRAME

FIG. 12

| FRAME NO. | DETAILS OF SUB CODE DATA Dsub | | | | | DETAILS OF VISIBLE IMAGE FORMATION DATA Dx | | |
|---|---|---|---|---|---|---|---|---|
| | | | | S0 | | | S0 | |
| | | | | | S1 | | | S1 |
| 1 | | | | | | | | |
| 2 | | | | | | | | |
| 3 | P1 | Q1 | R1 | S1 | W1 | Cm1 | PWM1 | (0,1,2,3,4,5,6) |
| 4 | P2 | Q2 | R2 | S2 | W2 | Cm2 | PWM2 | (0,1,2,3,4,5,6) |
| 5 | P3 | Q3 | R3 | S3 | W3 | Cm3 | PWM3 | (0,1,2,3,4,5,6) |
| 6 | P4 | Q4 | R4 | S4 | W4 | Cm4 | PWM4 | (0,1,2,3,4,5,6) |
| 7 | P5 | Q5 | R5 | S5 | W5 | Cm5 | PWM5 | (0,1,2,3,4,5,6) |
| 8 | P6 | Q6 | R6 | S6 | W6 | Cm6 | PWM6 | (0,1,2,3,4,5,6) |
| 9 | P7 | Q7 | R7 | S7 | W7 | Cm7 | PWM7 | (0,1,2,3,4,5,6) |
| 10 | P8 | Q8 | R8 | S8 | W8 | Cm8 | PWM8 | (0,1,2,3,4,5,6) |
| 11 | P9 | Q9 | R9 | S9 | W9 | Cm9 | PWM9 | (0,1,2,3,4,5,6) |
| 12 | P10 | Q10 | R10 | S10 | W10 | Cm10 | PWM10 | (0,1,2,3,4,5,6) |
| 13 | P11 | Q11 | R11 | S11 | W11 | Cm11 | PWM11 | (0,1,2,3,4,5,6) |
| 14 | P12 | Q12 | R12 | S12 | W12 | Cm12 | PWM12 | (0,1,2,3,4,5,6) |
| 15 | P13 | Q13 | R13 | S13 | W13 | Cm13 | PWM13 | (0,1,2,3,4,5,6) |
| 16 | P14 | Q14 | R14 | S14 | W14 | Cm14 | PWM14 | (0,1,2,3,4,5,6) |
| 17 | P15 | Q15 | R15 | S15 | W15 | Cm15 | PWM15 | (0,1,2,3,4,5,6) |
| 18 | P16 | Q16 | R16 | S16 | W16 | Cm16 | PWM16 | (0,1,2,3,4,5,6) |
| 19 | P17 | Q17 | R17 | S17 | W17 | Cm17 | PWM17 | (0,1,2,3,4,5,6) |
| 20 | P18 | Q18 | R18 | S18 | W18 | Cm18 | PWM18 | (0,1,2,3,4,5,6) |
| ... | ... | ... | ... | ... | ... | ... | ... | ... |
| 95 | P93 | Q93 | R93 | S93 | W93 | Cm93 | PWM93 | (0,1,2,3,4,5,6) |
| 96 | P94 | Q94 | R94 | S94 | W94 | Cm94 | PWM94 | (0,1,2,3,4,5,6) |
| 97 | P95 | Q95 | R95 | S95 | W95 | Cm95 | PWM95 | (0,1,2,3,4,5,6) |
| 98 | P96 | Q96 | R96 | S96 | W96 | Cm96 | PWM96 | (0,1,2,3,4,5,6) |

RECTANGULAR COORDINATES

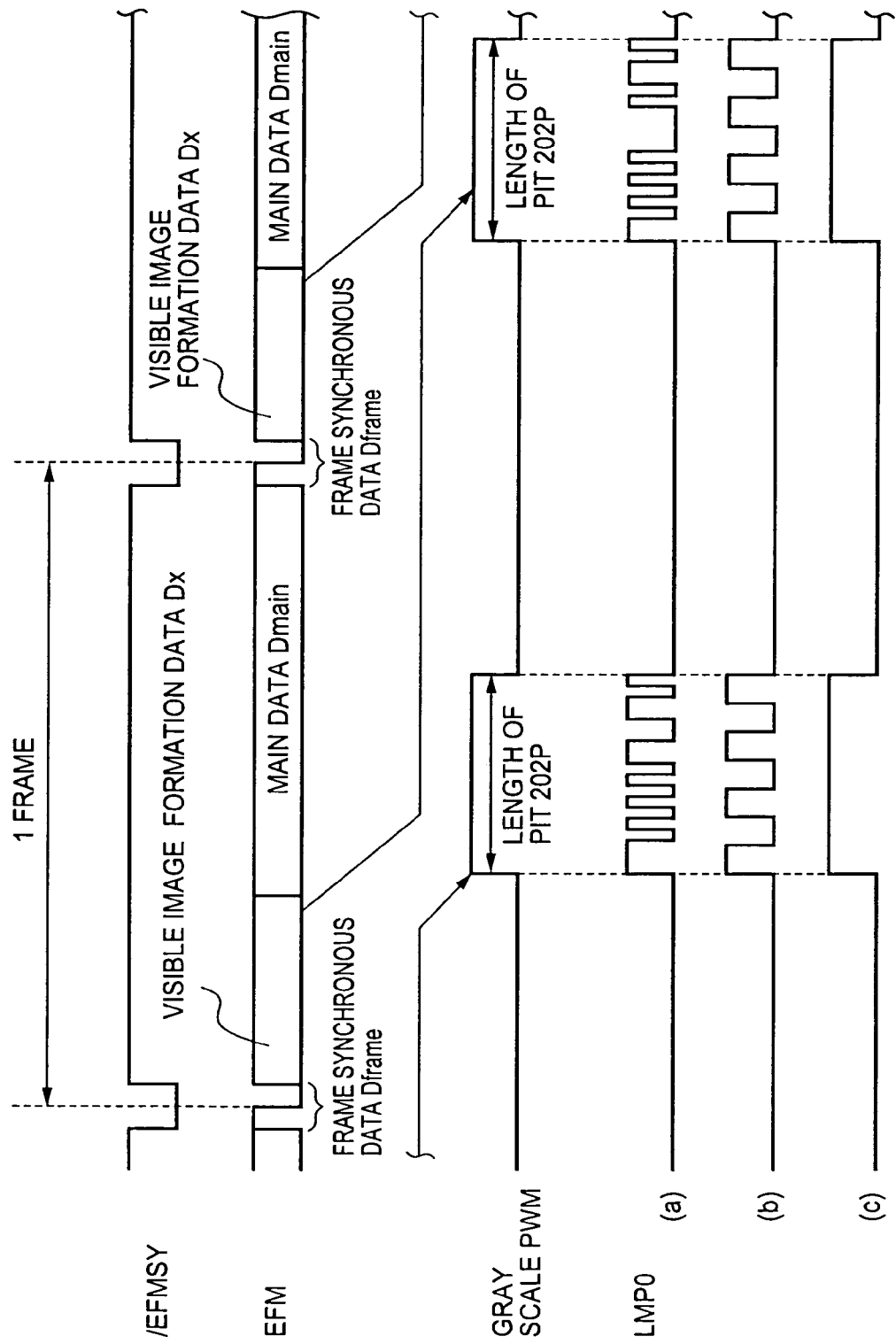

FIG. 21

| FRAME NO. | DETAILS OF SUB CODE DATA Dsub | | | | | DETAILS OF VISIBLE IMAGE FORMATION DATA Dx | | |
|---|---|---|---|---|---|---|---|---|
| | | S0 | S1 | | | | S0 | S1 |
| 1 | | | | | | | | |
| 2 | | | | | | | | |
| 3 | P1 | Q1 | R1 | S1 | ... | W1 | Cm1 | 0 | PWM1 | (0,1,2)×2 |
| 4 | P2 | Q2 | R2 | S2 | ... | W2 | Cm2 | 0 | PWM2 | (0,1,2)×2 |
| 5 | P3 | Q3 | R3 | S3 | ... | W3 | Cm3 | 0 | PWM3 | (0,1,2)×2 |
| 6 | P4 | Q4 | R4 | S4 | ... | W4 | Cm4 | 0 | PWM4 | (0,1,2)×2 |
| 7 | P5 | Q5 | R5 | S5 | ... | W5 | Cm5 | 0 | PWM5 | (0,1,2)×2 |
| 8 | P6 | Q6 | R6 | S6 | ... | W6 | Cm6 | 0 | PWM6 | (0,1,2)×2 |
| 9 | P7 | Q7 | R7 | S7 | ... | W7 | Cm7 | 0 | PWM7 | (0,1,2)×2 |
| 10 | P8 | Q8 | R8 | S8 | ... | W8 | Cm8 | 0 | PWM8 | (0,1,2)×2 |
| 11 | P9 | Q9 | R9 | S9 | ... | W9 | Cm9 | 0 | PWM9 | (0,1,2)×2 |
| 12 | P10 | Q10 | R10 | S10 | ... | W10 | Cm10 | 0 | PWM10 | (0,1,2)×2 |
| 13 | P11 | Q11 | R11 | S11 | ... | W11 | Cm11 | 0 | PWM11 | (0,1,2)×2 |
| 14 | P12 | Q12 | R12 | S12 | ... | W12 | Cm12 | 0 | PWM12 | (0,1,2)×2 |
| 15 | P13 | Q13 | R13 | S13 | ... | W13 | Cm13 | 0 | PWM13 | (0,1,2)×2 |
| 16 | P14 | Q14 | R14 | S14 | ... | W14 | Cm14 | 0 | PWM14 | (0,1,2)×2 |
| 17 | P15 | Q15 | R15 | S15 | ... | W15 | Cm15 | 0 | PWM15 | (0,1,2)×2 |
| 18 | P16 | Q16 | R16 | S16 | ... | W16 | Cm16 | 0 | PWM16 | (0,1,2)×2 |
| 19 | P17 | Q17 | R17 | S17 | ... | W17 | Cm17 | 0 | PWM17 | (0,1,2)×2 |
| 20 | P18 | Q18 | R18 | S18 | ... | W18 | Cm18 | 0 | PWM18 | (0,1,2)×2 |
| ... | ... | ... | ... | ... | ... | ... | ... | ... | ... | ... |
| 95 | P93 | Q93 | R93 | S93 | ... | W93 | Cm93 | 0 | PWM93 | (0,1,2)×2 |
| 96 | P94 | Q94 | R94 | S94 | ... | W94 | Cm94 | 0 | PWM94 | (0,1,2)×2 |
| 97 | P95 | Q95 | R95 | S95 | ... | W95 | Cm95 | 0 | PWM95 | (0,1,2)×2 |
| 98 | P96 | Q96 | R96 | S96 | ... | W96 | Cm96 | 0 | PWM96 | (0,1,2)×2 |

FIG. 22

| FRAME NO. | DETAILS OF SUB CODE DATA Dsub | | | | | DETAILS OF VISIBLE IMAGE FORMATION DATA Dx | | | | |
|---|---|---|---|---|---|---|---|---|---|---|
| | | | | S0 | | | | | S0 | |
| | | | | | S1 | | | | | S1 |
| 1 | | | | | | | | | | |
| 2 | | | | | | | | | | |
| 3 | P1 | Q1 | R1 | S1 | W1 | P1 | Q1 | Cm1 | PWM1 | (0,1,2,3,4,5,6) |
| 4 | P2 | Q2 | R2 | S2 | W2 | P2 | Q2 | Cm2 | PWM2 | (0,1,2,3,4,5,6) |
| 5 | P3 | Q3 | R3 | S3 | W3 | P3 | Q3 | Cm3 | PWM3 | (0,1,2,3,4,5,6) |
| 6 | P4 | Q4 | R4 | S4 | W4 | P4 | Q4 | Cm4 | PWM4 | (0,1,2,3,4,5,6) |
| 7 | P5 | Q5 | R5 | S5 | W5 | P5 | Q5 | Cm5 | PWM5 | (0,1,2,3,4,5,6) |
| 8 | P6 | Q6 | R6 | S6 | W6 | P6 | Q6 | Cm6 | PWM6 | (0,1,2,3,4,5,6) |
| 9 | P7 | Q7 | R7 | S7 | W7 | P7 | Q7 | Cm7 | PWM7 | (0,1,2,3,4,5,6) |
| 10 | P8 | Q8 | R8 | S8 | W8 | P8 | Q8 | Cm8 | PWM8 | (0,1,2,3,4,5,6) |
| 11 | P9 | Q9 | R9 | S9 | W9 | P9 | Q9 | Cm9 | PWM9 | (0,1,2,3,4,5,6) |
| 12 | P10 | Q10 | R10 | S10 | W10 | P10 | Q10 | Cm10 | PWM10 | (0,1,2,3,4,5,6) |
| 13 | P11 | Q11 | R11 | S11 | W11 | P11 | Q11 | Cm11 | PWM11 | (0,1,2,3,4,5,6) |
| 14 | P12 | Q12 | R12 | S12 | W12 | P12 | Q12 | Cm12 | PWM12 | (0,1,2,3,4,5,6) |
| 15 | P13 | Q13 | R13 | S13 | W13 | P13 | Q13 | Cm13 | PWM13 | (0,1,2,3,4,5,6) |
| 16 | P14 | Q14 | R14 | S14 | W14 | P14 | Q14 | Cm14 | PWM14 | (0,1,2,3,4,5,6) |
| 17 | P15 | Q15 | R15 | S15 | W15 | P15 | Q15 | Cm15 | PWM15 | (0,1,2,3,4,5,6) |
| 18 | P16 | Q16 | R16 | S16 | W16 | P16 | Q16 | Cm16 | PWM16 | (0,1,2,3,4,5,6) |
| 19 | P17 | Q17 | R17 | S17 | W17 | P17 | Q17 | Cm17 | PWM17 | (0,1,2,3,4,5,6) |
| 20 | P18 | Q18 | R18 | S18 | W18 | P18 | Q18 | Cm18 | PWM18 | (0,1,2,3,4,5,6) |
| ... | ... | ... | ... | ... | ... | ... | ... | ... | ... | ... |
| 95 | P93 | Q93 | R93 | S93 | W93 | P93 | Q93 | Cm93 | PWM93 | (0,1,2,3,4,5,6) |
| 96 | P94 | Q94 | R94 | S94 | W94 | P94 | Q94 | Cm94 | PWM94 | (0,1,2,3,4,5,6) |
| 97 | P95 | Q95 | R95 | S95 | W95 | P95 | Q95 | Cm95 | PWM95 | (0,1,2,3,4,5,6) |
| 98 | P96 | Q96 | R96 | S96 | W96 | P96 | Q96 | Cm96 | PWM96 | (0,1,2,3,4,5,6) |

METHOD, PROGRAM AND SYSTEM OF FORMING VISUAL IMAGE ON OPTICAL DISK

BACKGROUND OF THE INVENTION

1. Technical Field of the Invention

The present invention relates to an optical disk recording apparatus capable of forming a visible image in addition to recording data on an optical disk.

2. Description of the Related Art

Recently, there are provided optical disk recording apparatuses capable of forming visible images, such as characters and patterns, in addition to conventional data recording, such as audio data recording, on a CD-R (Compact Disc-Recordable) or the like. This type of optical disk recording apparatus is adapted to apply a laser beam to a region where no data has been recorded so as to thermally discolor a part of the non-recorded region for forming characters, patterns or other visible images (refer to, for example, non-patent literature 1).

The non-patent document 1 is Yamaha Corporation Official website "DiscT@2" for CD-R/R products, [online], Aug. 2, 2002, Yamaha Corporation, [searched on Oct. 11, 2002], Internet URL:http://www.yamaha.co.jp/product/computer/handbook/discta2.html However, in the optical disk recording apparatus, data to be processed for recording the data has been EFM-modulated and the format or the like thereof has been significantly different from that of image data to be processed for forming a visible image. For this reason, it has been necessary to provide the optical disk recording apparatus with a signal processing circuit used for recording data and another signal processing circuit used for forming visible images, separately from each other. This has been posing a problem in which the circuit scale of the apparatus becomes inevitably large, and a new LSI design or a considerable modification in a control program is inconveniently required.

SUMMARY OF THE INVENTION

The present invention has been made in view of the above drawbacks of the prior art, and it is an object thereof to provide a visible image forming method that permits visible images to be formed with a minimized change of the configuration for recording data onto an optical disk, and a program and a visible image forming system therefor.

To this end, there is provided a visible image forming method for forming a visible image on an optical disk by an optical disk recording apparatus, which is designed for applying a laser beam onto an optical disk according to first recording data of a predetermined format to form pits having lengths specified by the first recording data. The visible image forming method comprises a generating step for generating second recording data by embedding image formation data of a visible image in a part of a predetermined format which is the same as predetermined for the first recording data, an extracting step for extracting the image formation data of the visible image from the second recording data of the predetermined format, and a forming step for forming pits in the optical disk according to the extracted image formation data so as to form the visible image on the optical disk.

Preferably, the optical disk has a spiral guiding groove on a recording surface of the optical disk, the spiral guiding groove being divided substantially at an equal interval to define a sequence of regions along the spiral guiding groove, and the image formation data of the visible image specifies the length of the pit to be formed in each region of the spiral guiding groove.

Preferably, the visible image forming method further comprises a converting step preceding the generating step for converting original image data representing the visual image by rectangular coordinates into the image formation data specifying the length of the pit to be formed in each region of the spiral guiding groove.

Preferably, the predetermined format has blocks each having a plurality of frames, each frame having a region for containing main data to be recorded, and the generating step embeds the image formation data of the visible image in a part or whole of the region of each frame.

BRIEF DESCRIPTION OF THE DRAWINGS

FIG. 12 is a schematic diagram showing the details of first and second recording data.

FIG. 20 is a timing chart for explaining the operation of the optical disk recording apparatus.

FIG. 21 is a table diagram for explaining a modification example of the present invention.

FIG. 22 is a table diagram for explaining another modification example of the present invention.

DETAILED DESCRIPTION OF THE INVENTION

Figure 1:
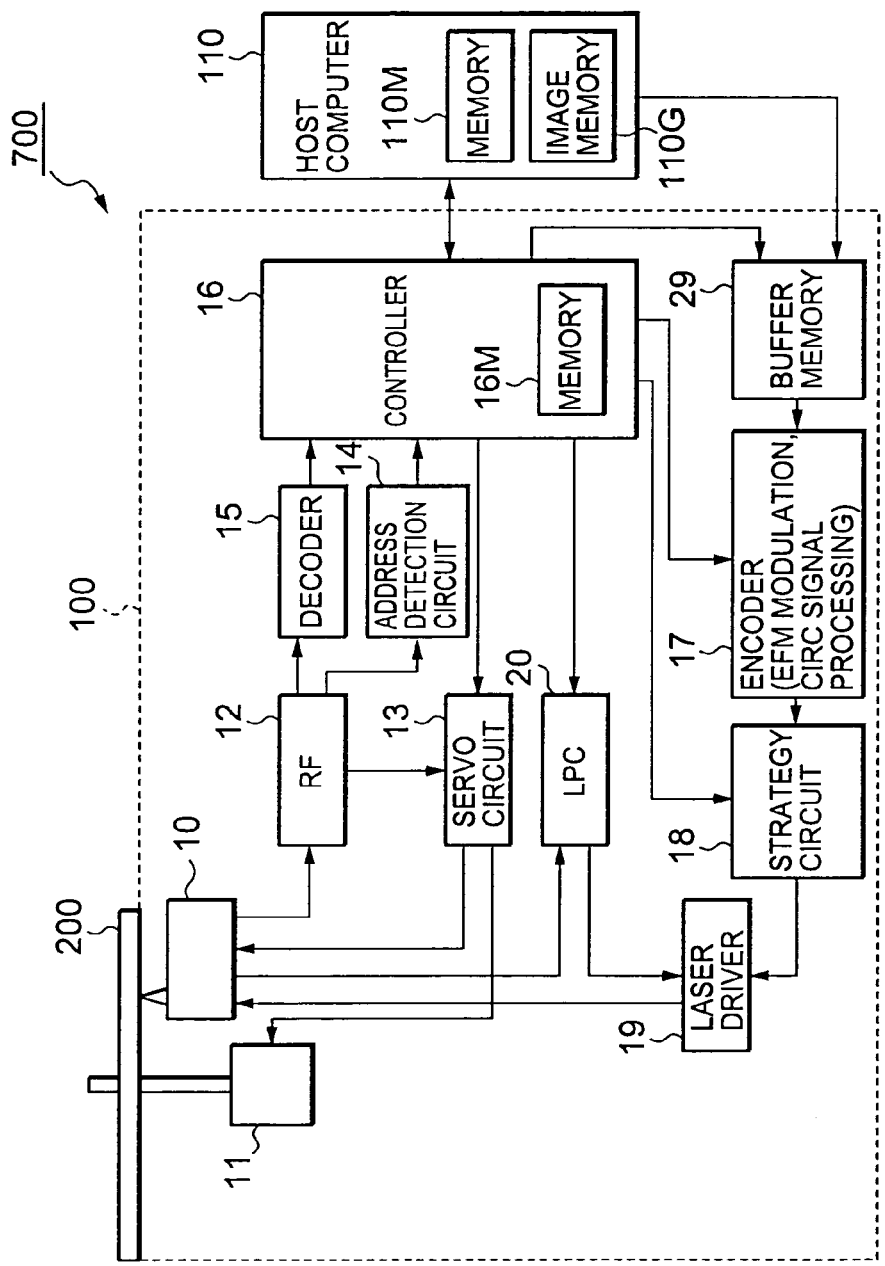
FIG. 1 is a block diagram showing the construction of an inventive image formation system including an optical disk recording apparatus according to an embodiment of the present invention.

Embodiments of the present invention will be explained with reference to the accompanying drawings. FIG. 1 is a block diagram showing the construction of a visible image forming system incorporating an optical disk recording apparatus (hereinafter referred to simply as "the system") according to the embodiment of the invention.

As shown in the figure, a system 700 is constructed of an optical disk recording apparatus 100 and a host computer 110. Data is recorded or visible images are formed on an optical disk 200 set on the optical disk recording apparatus 100.

<Host Computer>

The host computer 110 constituting the system 700 is a personal computer or the like and has a display screen and a keyboard or other similar means for input through keys. Installed beforehand in the host computer 110 is a dedicated application program for recording data or forming visible images by using the system 700. Using the application program, the host computer 110 supplies the data (audio data, document data, etc.) to be recorded on the optical disk 200 to the optical disk recording apparatus 100 when recording the data. The host computer 110 also carries out coordinate conversion on the data for forming an image (bit map data or the like) on the optical disk 200, which will be discussed hereinafter, and supplies the processed image data to the optical disk recording apparatus 100 in the visible image formation mode.

<Optical Disk>

Figure 2:
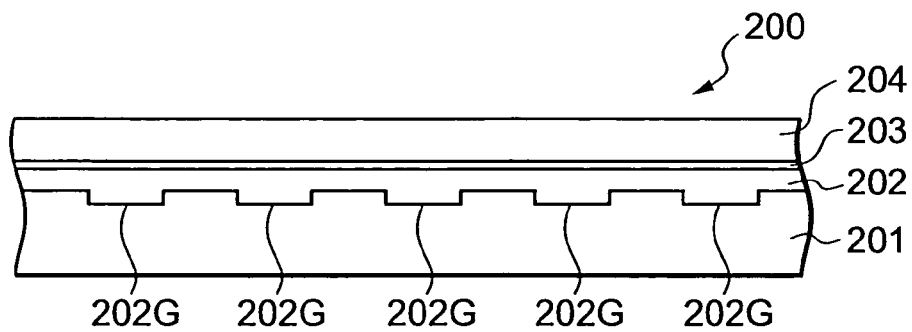
FIG. 2 is a partial side sectional view of an optical disk on which data is recorded by the optical disk recording apparatus.

The optical disk 200 will now be explained, taking a CD-R as an example. FIG. 2 is a partial sectional view of the optical disk 200. As shown in the figure, the optical disk 200 has a structure in which a substrate protective layer 201, a recording layer 202, a reflective layer 203 and a protective layer 204 are laminated, as observed from the recording surface side.

A spiral groove (guiding groove) 202G is formed on the recording layer 202. To record data, a laser beam is applied along the groove 202G (ON groove recording). The recording layer 202 is configured such that the reflectivity of a portion thereof where the laser beam has been applied changes after the portion is subjected to heat of a predetermined amount or more by the application of the laser beam. The portion where the reflectivity changes is called a "pit," and the area between pits formed on the groove 202G is called a "land."

Figure 3:
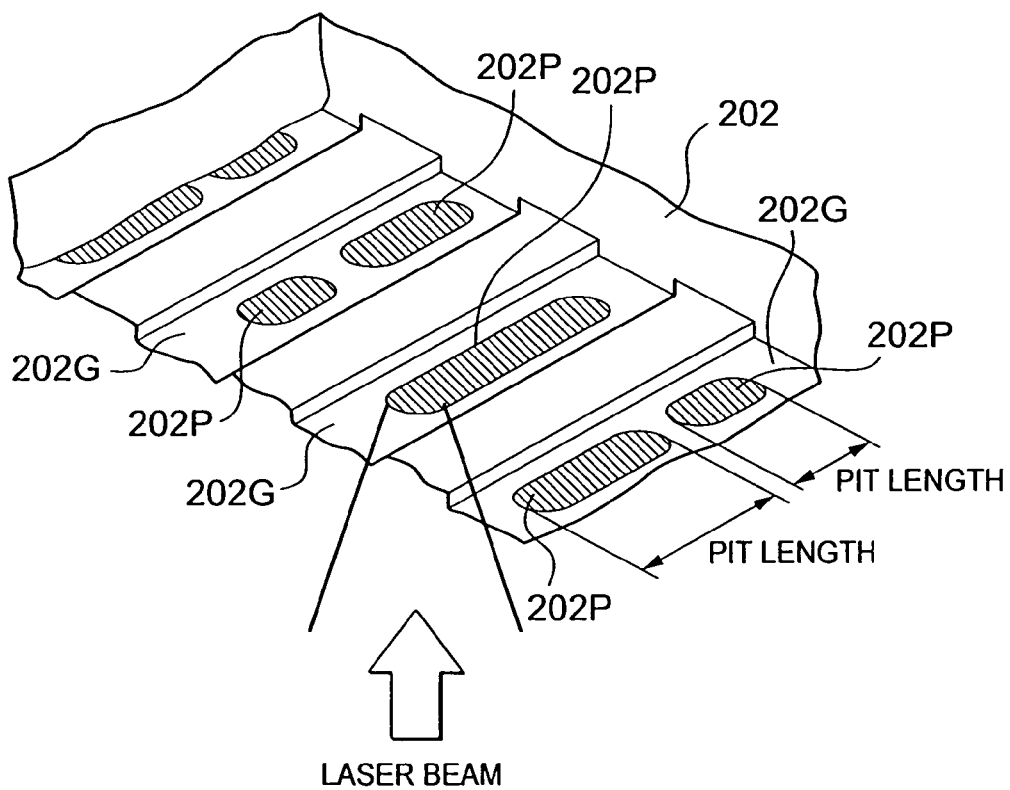
FIG. 3 is a schematic diagram showing pits formed in the optical disk.

The description will now be given of how data is recorded or how a visible image is formed on the optical disk 200 described above. FIG. 3 shows a state wherein pits 202P and lands 202L formed on the groove 202G by the laser beam applied along the groove 202G. The length of each of the pits 202P and the lands 202L is decided according to the type of data to be recorded, ranging from a few hundred nm to a few μm.

The actual groove 202G is formed in a gentle meandering manner. Information on disk positions (address information) is obtained by demodulating the signals on the meandering. For the convenience of explanation, the meandering of the groove 202G is not shown in the figure.

To reproduce recorded data, a laser beam of a low intensity for reproduction (for servo) is applied along the groove 202G. The pits 202P and the lands 202L have different reflectivity, so that the lengths of the pits 202P and the lands 202L are detected by detecting the changes in the intensity of reflective light observed when the laser beam is applied along the groove 202G. Thus, data is reproduced.

The description will now be given of how a visible image is formed. As in the case of data recording, a visible image is formed also by forming the pits 202P on the optical disk 200 (the recording layer 202).

Figure 4:
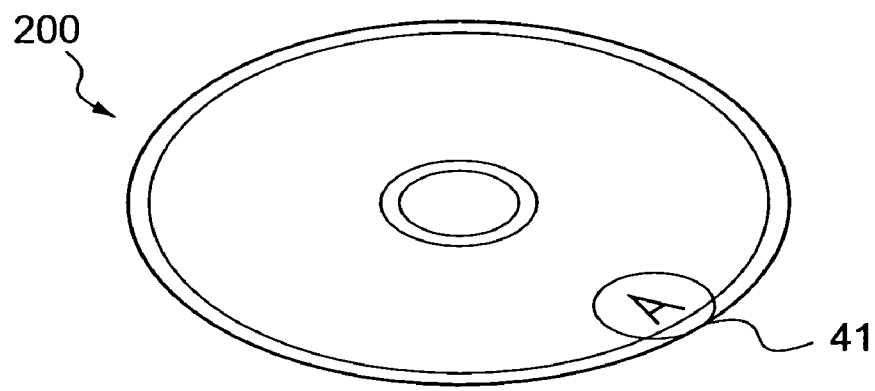
FIG. 4 is a schematic diagram for explaining a visible image formed on the optical disk.
Figure 5:
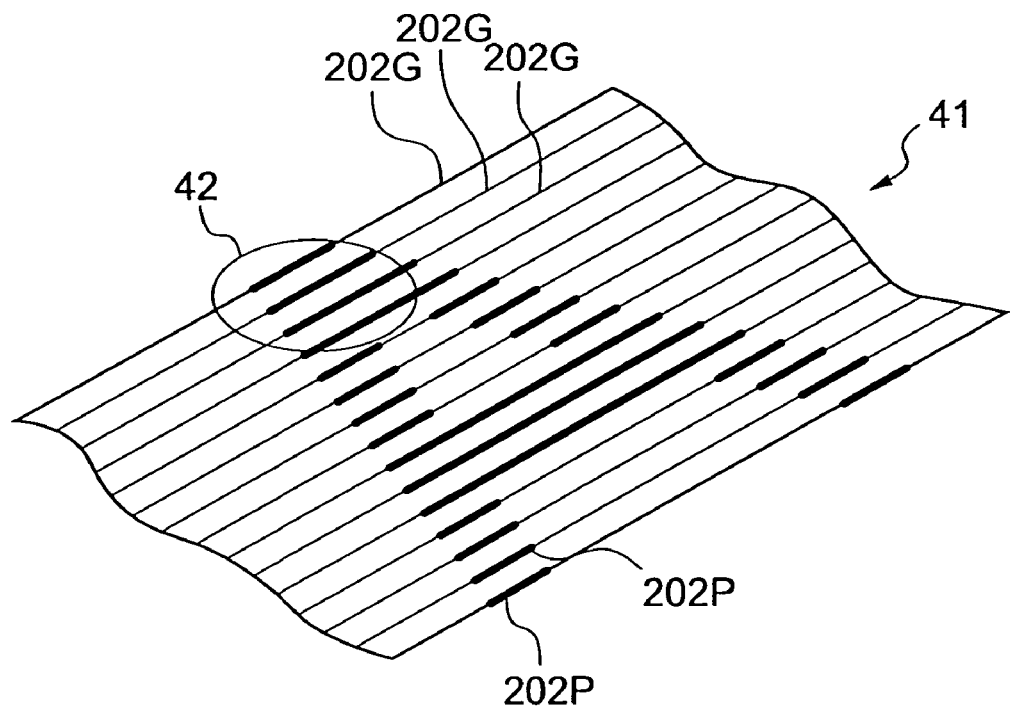
FIG. 5 is a schematic diagram for explaining the visible image formed on the optical disk.
Figure 6:
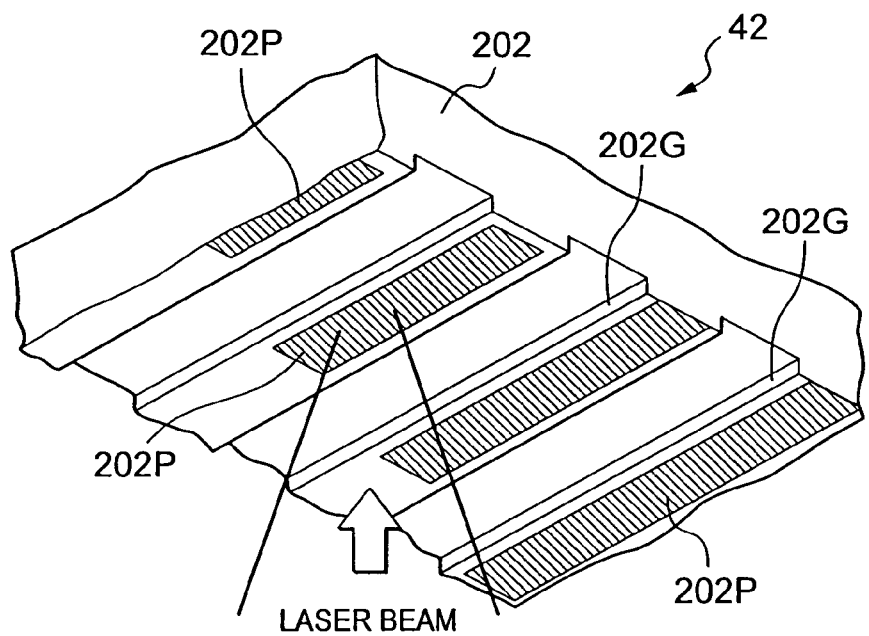
FIG. 6 is a schematic diagram for explaining the visible image formed on the optical disk.

FIG. 4 through FIG. 6 shows the state wherein a visible image has been formed on the optical disk 200 by forming the pits 202P. In this example, an alphabet character "A" has been formed as a visible image.

FIG. 4 is a diagram showing the entire optical disk 200, FIG. 5 is an enlarged view of a region 41 shown in FIG. 4, and FIG. 6 is an enlarged view of the region 42 shown in FIG. 5. FIG. 6 shows the picture upside down from that in FIG. 4 and FIG. 5 to clearly indicate the contrast with the data recording mode (FIG. 3).

As illustrated by the enlarged view in FIG. 6, the pits 202P are formed in the region corresponding to the character shape of the alphabet "A." This causes the alphabet character "A" to be recognized as a visible image when observed in the entire optical disk 200.

To be more specific, the reflectivity differs between the areas where the pits 202P are formed and the areas free of the pits (i.e., the lands). Hence, when a white light beam (a visible beam of light having a wavelength of about 400 nm to about 700 nm) is applied to the entire optical disk, a difference in light intensity takes place between the reflective light reflected by the pits 202P and the reflective light reflected by the areas free of the pits 202P, thus forming an image.

Figure 7:
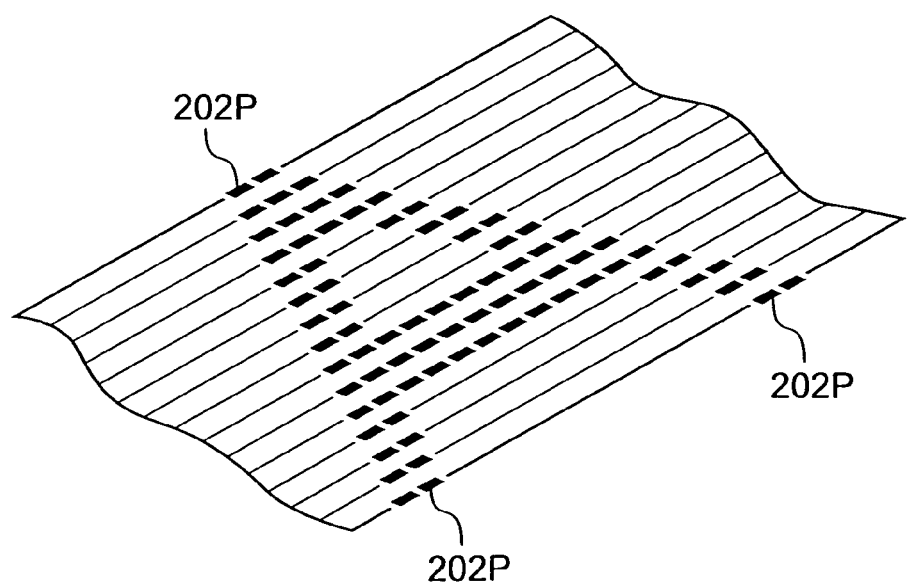
FIG. 7 is a schematic diagram showing an example of the pits constituting the visible image.
Figure 8:
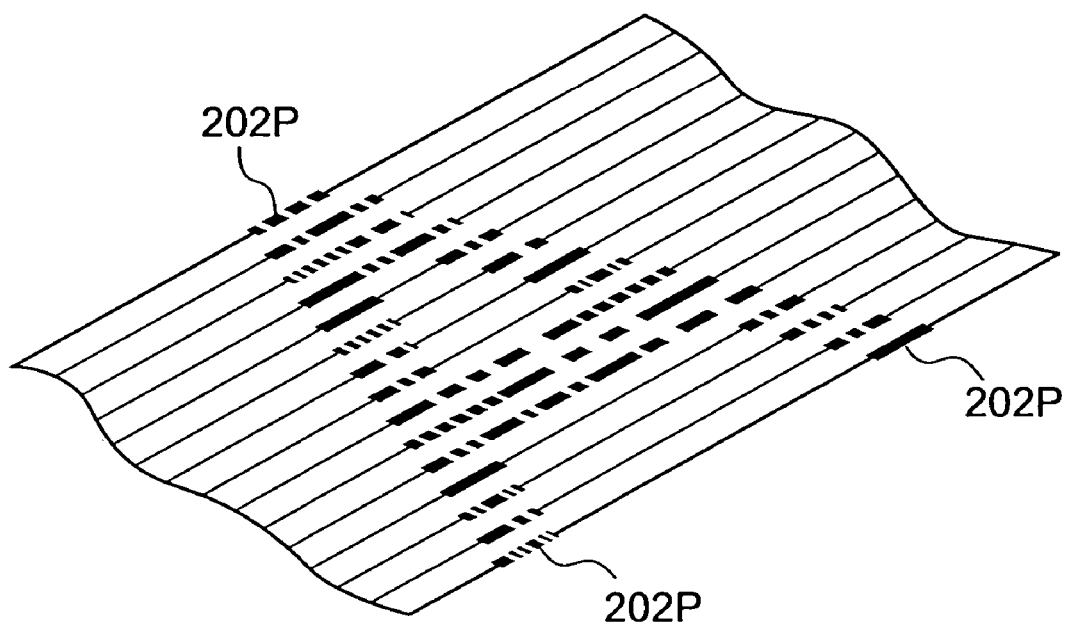
FIG. 8 is a schematic diagram showing another example of the pits constituting the visible image.

In this case, the length of the pits 202P for forming visible images may be arbitrarily set. The pits corresponding to the character shape of the alphabet "A" may be formed, as shown in FIG. 5, or shorter pits 202P of the same length may be arranged in a grid pattern, as shown in FIG. 7. Alternatively, shorter pits 202P of different lengths may be arranged, as shown in FIG. 8. For example, pits 202P partially corresponding EFM data may be formed.

The pits 202P may be formed in other fashions as long as reduced reflectivity attributable to the formation of the pits 202P is recognizable when the entire optical disk 200 is observed.

<Optical Disk Recording Apparatus>

Referring back to FIG. 1, the construction of the optical disk recording apparatus 100 will be explained. In this figure, a controller 16 controls each section of the apparatus according to a program stored beforehand in a memory (storage) 16M.

A spindle motor 11 is a motor that rotatively drives the optical disk 200. In this embodiment, the optical disk 200 is rotatively driven at a constant linear velocity (CLV) when recording data and when forming a visible image.

An optical pickup 10 is a unit composed mainly of a laser diode, and an optical system, such as an object lens and a mirror, and a light receiving element for receiving return light.

When recording (reproducing) data or forming a visible image, the optical pickup 10 applies a laser beam to the optical disk 200 and receives the reflected light (return light) obtained when the laser beam is applied. Here, to reproduce the data, the optical pickup 10 outputs an RF signal, which is a light receiving signal and which has been subjected to EFM (Eight to Fourteen Modulation) modulation, to an RF amplifier 12. Strictly speaking, although the "EFM modulation" is not an accurate expression, it will be used to mean "8-14 bit conversion" in this explanation.

The optical pickup 10 has a monitoring diode. When current passes through the monitoring diode when a laser beam is emitted, the signal corresponding to the amount of the current is supplied to a laser power control circuit (LPC) 20.

The RF amplifier 12 supplies a signal associated with the reflected light, which is obtained by applying a laser beam to the optical disk 200, mainly to a servo circuit 13 and an address detection circuit 14 when recording data or forming a visible image. When reproducing data, the RF amplifier 12 amplifies the RF signals from the optical pickup 10 and supplies the amplified RF signals mainly to the servo circuit 13 and a decoder 15.

The decoder 15 carries out EFM demodulation on an EFM-modulated RF signal supplied from the RF amplifier 12 so as to convert it into reproduction data when reproducing data.

In the data recording mode or the visible image formation mode, the address detection circuit 14 extracts a wobble signal component from a signal supplied from the RF amplifier 12 and outputs the information obtained by decoding the address information (disk position information) contained in the wobble signal component to the controller 16.

The servo circuit 13 mainly performs the revolution control of the spindle motor 11, and the focusing control and tracking control in the optical pickup 10. The revolution control in the spindle motor 11 is such that the revolution speed of the spindle motor 11 is reduced as the disk position indicated by address information moves outwards so as to maintain a constant linear velocity in the disk position. The focusing control in the optical pickup 10 is such that an object lens is operated in the direction perpendicular to the recording surface of the optical disk 200 so as to maintain a constant spot diameter of a laser beam with respect to the optical disk 200 when the optical disk 200 rotates. The tracking control is such that the object lens is operated in the direction horizontal to the recording surface of the optical disk 200 so as to make the irradiation point of the laser beam follow the groove 202G when the optical disk 200 rotates.

The laser power control circuit 20 is a circuit for controlling the intensity of a laser beam (power level) emitted from the laser diode of the optical pickup 10 so as to obtain an optimum intensity. To be more specific, the laser power control circuit 20 controls a laser driver 19 such that the value of current supplied from the monitoring diode of the optical pickup 10 coincides with the information indicating the target value of optimum laser power supplied from the controller 16. The target value of optimum laser power is determined in advance by recording experiments or the like.

Meanwhile, a buffer memory 29 in the data recording mode stores the data supplied from the host computer 110, that is, the data (audio data, document data, etc.) to be recorded on the optical disk 200, in the first-in first-out manner. In the visible image formation mode, the buffer memory 29 stores the data obtained by subjecting image data to coordinate conversion and stores the obtained data in the first-in first-out manner.

An encoder 17 carries out EFM modulation or code error correction encoding (hereinafter referred to as "CIRC" (Cross Interleave Reed-Solomon Coding)) on the data (audio data, etc.) read from the buffer memory 29, then supplies the processed data (hereinafter referred to as "the first recording data") to a strategy circuit 18 in the data recording mode.

Stored beforehand in a memory (storage) 110M of the host computer 110 is certain data in the same data format as that of the first recording data. The data shares the same data format as that of the first recording data in terms of format, but it is prepared as so-called dummy data to generate second recording data, which will be explained below, rather than the data to be recorded on the optical disk 200.

When forming a visible image, the dummy data is supplied from the host computer 110 to the encoder 17 via the control of the controller 16.

The encoder 17 substitutes a part of the supplied dummy data with the image data supplied from the image memory 110G, and outputs the data as the second recording data. The encoder 17 supplies the generated second recording data to the strategy circuit 18.

As it will be discussed hereinafter, the second recording data is generated simply by substituting a part of the dummy data with another data. Thus, the first recording data and the second recording data share the same data format, making it possible to accomplish the signal processing on the first and second recording data by the same circuit. The signal processing will be discussed in details hereinafter.

The strategy circuit 18 is a circuit for generating pulse signals (strategy signals) designating the timings at which laser beams are to be applied to the optical disk 200. More specifically, in the data recording mode, if the first recording data supplied from the encoder 17 is to form the pit 202P, then the strategy circuit 18 generates a strategy signal for forming the pit 202P having the length corresponding to the data on the optical disk 200 and supplies the generated strategy signal to the laser driver 19.

Furthermore, in the visible image formation mode, if the second recording data supplied from the encoder 17 is to form the pit 202P, then the strategy circuit 18 generates a strategy signal for forming the pit 202P having the length corresponding to the data on the optical disk 200 and supplies the generated strategy signal to the laser driver 19.

The laser driver 19 drives the laser diode of the optical pickup 10 such that a laser beam is emitted at an irradiation timing specified by a strategy signal supplied from the strategy circuit 18 and at the intensity controlled by the laser power control circuit 20. Thus, the laser beam from the optical pickup 10 is applied to the optical disk 200, thereby recording data or forming a visible image.

<First Recording Data>

For the convenience of explanation, of the first recording data and the second recording data supplied by the encoder 17, the contents of the former first recording data will be explained first.

Figure 9:
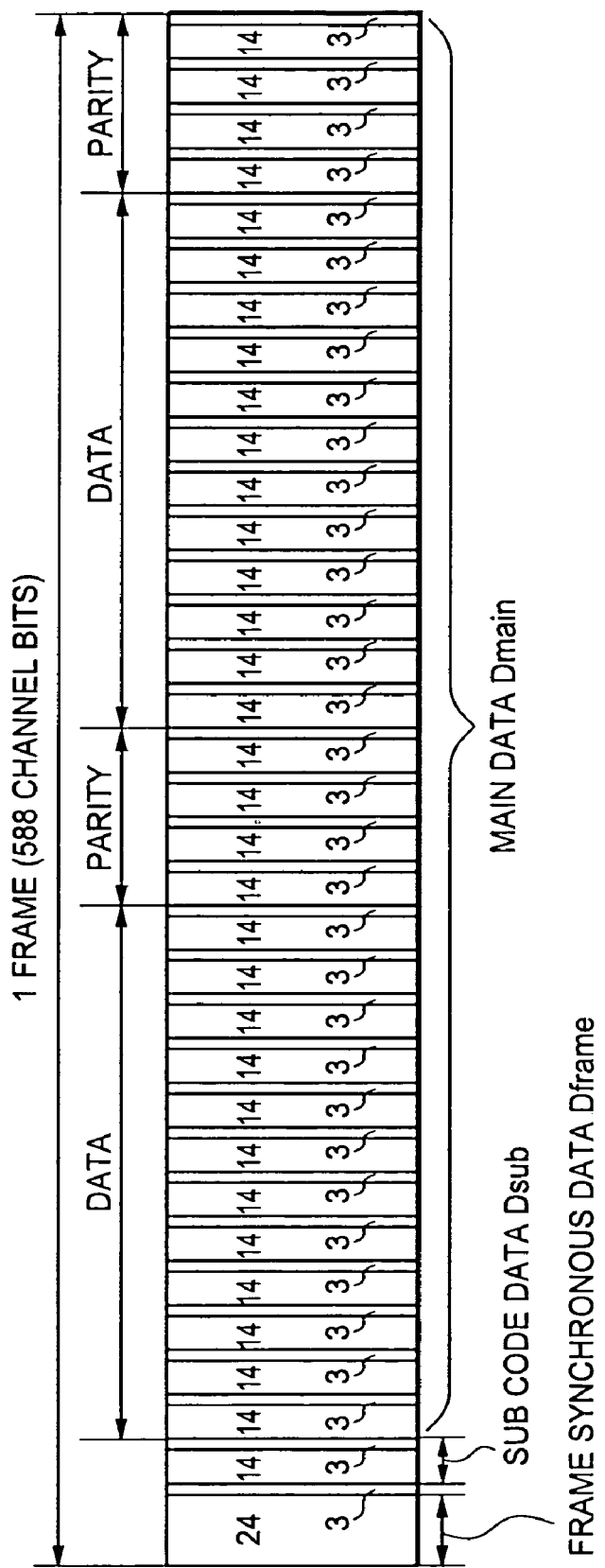
FIG. 9 is a schematic diagram showing the configuration of a data frame.

The first recording data is formalized using a format called "frame." FIG. 9 shows the format for one frame.

Frame synchronous data Dframe formed of 24 bits is added to the beginning of the frame. The frame synchronous data Dframe is the data that has a predetermined pattern and used for synchronization to identify the beginning of a frame when processing data. The frame synchronous data Dframe is also used as the calibration data for checking the irradiation level of a laser beam.

The frame synchronous data Dframe is immediately followed by 14-bit (8-bit, that is, 1-byte, before the EFM modulation) sub code data (also referred to as "sub coding") Dsub. The details of the sub code data Dsub will be discussed later.

The sub code data Dsub is followed by main data Dmain. The main data Dmain is composed of 24-symbol (1 symbol=14 bits) data to be recorded, such as music data and document data, and an 8-symbol parity for certifying the data.

If the 24-bit frame synchronous data Dframe is regarded also as one symbol, then three bits for connection are added between the individual symbols. Accordingly, one frame has a total of 588 channel bits.

The 24-symbol data in one frame corresponds to six samples of two channels, L and R, that is obtained by sampling music signals using 16 bits and 44.1-kHz frequency. Hence, the period of one frame is 136 μs (=6/44100).

Figures 10, 11:
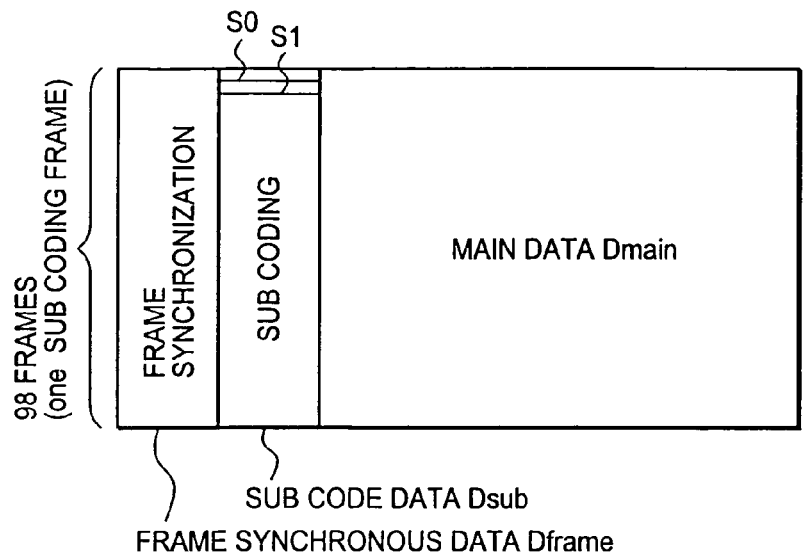
FIG. 10 is a schematic diagram showing the configuration of a sub coding frame.
FIG. 11 is a schematic diagram showing the details of sub code data.

The contents of the sub code data Dsub will now be explained in detail. As shown in FIG. 10, regarding the sub frame data Dsub, 98 frames constitute one block (sub coding frame). The sub coding frames are assigned sub coding frame numbers to identify them.

FIG. 11 shows the configuration of the sub code data Dsub in one sub coding frame. In the figure, the 98 frames making up the one sub coding frame are assigned frame numbers from "1" to "98." Thus, the sub code data Dsub can be uniquely identified by the sub coding frame number and the frame number in that sub coding frame. For the convenience of explanation, FIG. 11 shows the state before the EFM modulation wherein the data is divided by 8 bits.

Of the 98 frames of the sub code data Dsub in one sub coding frame, the sub code data Dsub whose frame number is "1" is called S0, and the sub code data Dsub whose frame number is "2" is called S1, both being used as synchronous signals. Therefore, the sub code data in one sub coding frame may be regarded as a 96-byte block that begins with the synchronous signals S0 and S1.

The sub code data having the frame numbers from "3" to "98" is constructed of eight types of independent data called P data, Q data, R data, . . . , W data. In FIG. 11, to identify the bits making up the data, in the P data, for example, the data having frame numbers of "3," "4," . . . and "98" is represented as P1, P2, . . . , P96. Similarly, of the Q data, the data having the frame numbers of "3," "4," . . . , and "98" is represented as Q1, Q2, . . . , Q96. The same applies to other R data, etc.

The P data is used for recording data to represent the information regarding the data to be recorded, while the Q data is used to represent time information of recording data (information, such as music numbers and recording time, if the data is audio data).

Thus, regarding the first recording data, not only the main data Dmain, which is the recording data itself (music data, document data, etc.), but the frame synchronous data Dframe and the sub code data Dsub, which are incidental to the recording data, are also formed into frames.

<Second Recording Data>

The contents of the second recording data supplied by the encoder 17 in the visible image formation mode will now be described in detail.

The second recording data corresponds to the data obtained by replacing the sub code data Dsub in the frame format of the first recording data described above by the data for forming a visible image (hereinafter referred to as "visible image formation data Dx). Both the sub code data Dsub and the visible image formation data Dx are both 8-bit, so that the first recording data and the second recording data share the same format.

FIG. 12 shows the sub code data Dsub vs. the visible image formation data Dx. The following will explain the visible image formation data Dx by referring to the figure.

As shown in the figure, the visible image formation data Dx having the frame numbers "1" and "2" are assigned the same synchronous signals S0 and S1, respectively, as those of the sub code data Dsub. Hence, in the second recording data also, the beginning of the block is detected by detecting the synchronous signals S0 and S1 when the 98 frames constitute one block.

The visible image formation data Dx in the frames numbered "3" to "98" is assigned the data for designating the lengths of the pits 202P to be formed on the optical disk 200. Before explaining the specific contents of the visible image formation data Dx, the description will be given of the coordinates providing the basis for forming visible images on the optical disk 200 in this embodiment.

Figure 13:
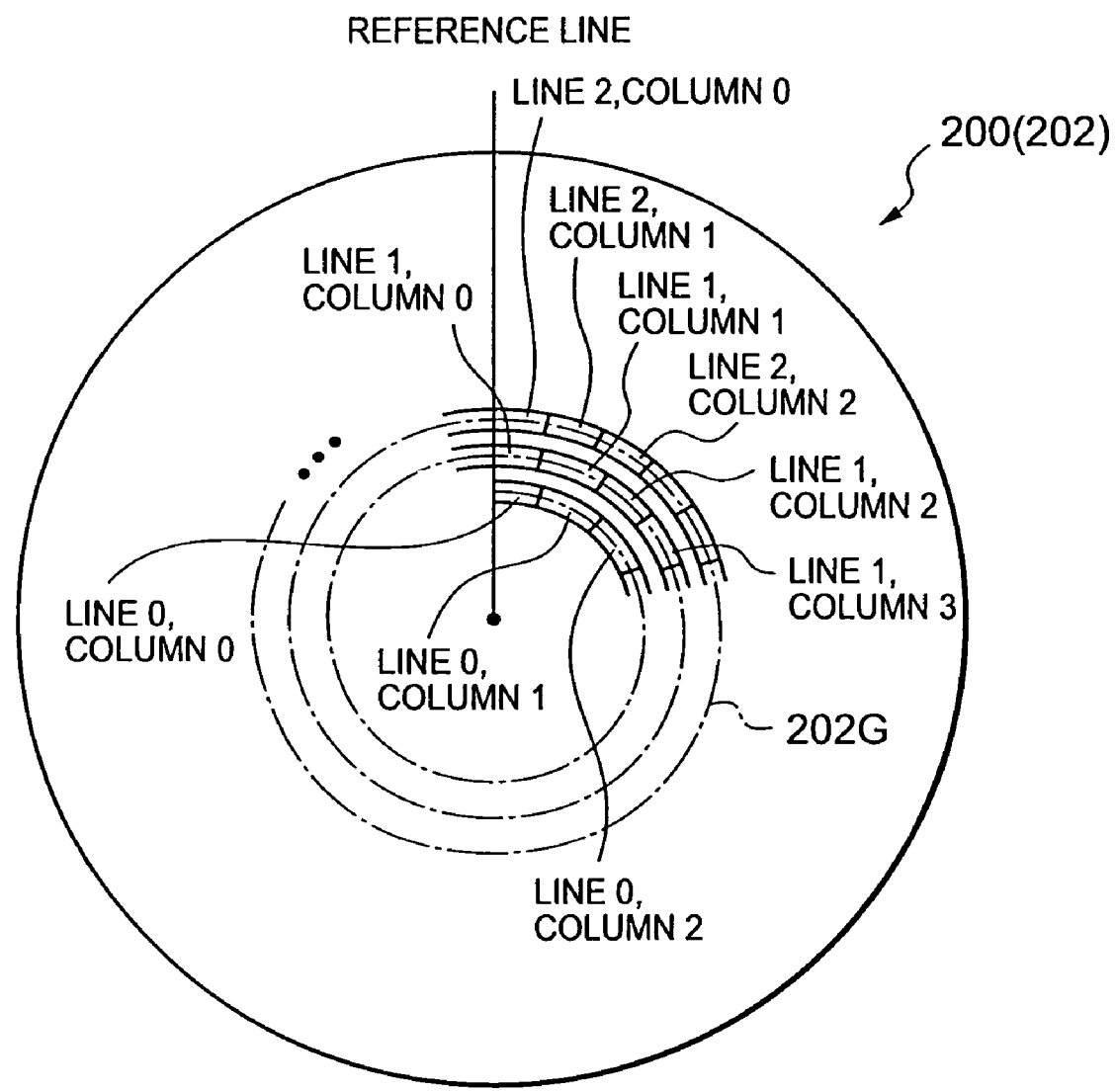
FIG. 13 is a schematic diagram for explaining CLV coordinates.

FIG. 13 shows the details of the coordinates adopted for forming visible images in this embodiment. The coordinates will be referred to as "CLV coordinates."

As shown in FIG. 13, the recording layer 202 of the optical disk 200 has the groove 202G spirally formed clockwise from the inner circumferential side toward the outer circumference. In this embodiment, the groove starting point is established as the reference point (line 0, column 0). When the optical disk 200 rotates at a constant linear velocity, the movement from the reference point for the period corresponding to one frame defines the unit region (dot) of the image to be formed. Accordingly, the irradiation point of a laser beam when the optical disk 200 rotates moves from column 0, column 1, column 2, column 3, . . . . . . , each time the period corresponding to one frame elapses.

When a virtual linear line that extends from the center of the optical disk 200 outward in the radial direction via the reference point is defined as a reference line, the optical disk 200 cross over the reference line once each time it turns once, so that the irradiation point of the laser beam will move one line each time the reference line is passed. Thus, one clockwise turn along the groove 202G from the reference point will provide the first line 0. Thereafter, the portion scanned each time the optical disk turns once will be line 1, line 2, line 3, . . . . . . in order.

Thus, in the CLV coordinates, the unit region of the image to be formed will be identified by line and column on the groove 202G. In other words, in the CLV coordinates, the spirally formed groove 202G on the optical disk 200 is divided at equal intervals, and the divided regions will be assigned the unit regions of the image to be formed.

In this case, a configuration is simply assumed in which, based on the irradiation point of the laser beam, the visible image formation data Dx for the unit region associated with the irradiation point is supplied as the sub code data, and the pit length in the unit region is specified on the basis of the data. However, it should be noted that, according to the configuration, the synchronous signals S0 and S1 are assigned to the sub codes of the frames having the frame numbers of "1" and "2." This means that the pit of the unit region cannot be formed during the period associated with the frames.

For this reason, in the embodiment, the gray scale data for specifying the pit length in one unit region uses 7 bits in one frame, leaving one bit, as shown in the right table of FIG. 12. When the gray scale data is expressed using 7 bits, the length of the pit 202P is specified by 128 levels of "0" to "127" in decimal notation. The reflectivity in the unit region of the optical disk 200 is decided by the total length of the pits 202P, thus allowing the gray scale to be represented in the unit region.

Then, the remaining one bit of each frame is collected to constitute the gray scale data for the two missing unit regions.

Eventually, of the eight bits in the sub code data having the frame numbers of "3" to "98," seven bits are used for the gray scale data for the 96 unit regions, and the remaining one bit in each sub code data of the frames of interest is collected to be used for the gray scale data for the two unit regions, thus providing a total of 98 gray scale data.

More specifically, the sub code data of the frames having the frame numbers of "3" to "98" defines 7-bit gray scale data PWM 1 through 96. Of the sub frame data of the frames having the frame numbers "3" to "9," the seven bits obtained by collecting the remaining 1-bits Cm 1 through Cm 7 are used to create gray scale data PWM 97. Of the sub frame data of the frames having the frame numbers "10" to "16," the seven bits obtained by collecting the remaining 1-bits Cm 10 through Cm 16 are used to create gray scale data PWM 98.

In FIG. 12, bits Cm 15 through Cm 96 of the sub code data having the frame numbers "17" through "98" are not particularly used in this embodiment; however, they may be arbitrarily allocated to control commands for drawing or the like.

The period corresponding to one frame is 136 μs, as mentioned above, and remains at a constant linear velocity in this embodiment, as mentioned above. Therefore, if the linear velocity is, for example, 1.2 m/s, then the distance in the column direction (rotational direction) in a unit region will be fixed to 163 μm (=1.2 m/s×136 μs) whether the position of a dot is closer to the inner circumference or the outer circumference.

In the CLV coordinates, the number of frames (the quantity of the unit regions) increases toward the outer circumference of the disk. Hence, in the spiral groove 202G, if dots are allotted in order for each movement distance equivalent to 1 frame, then the boundary between the last column of a certain line and the beginning column (column 0) of the next line does not necessarily lie on the reference line. This means that the concept of the lines in the embodiment involves some error.

<Recording Operation>

The recording operation of the system 700 will now be explained.

<Processing in the Host Computer>

Before explaining the optical disk recording apparatus 100 of the system 700, the processing carried out in the host computer 110 will be first described for the convenience of explanation. First, when a user performs a predetermined operation on a key input means, the host computer 110 starts up the dedicated application program for the system 700. Starting up the program establishes a data communication path between the host computer 110 and the optical disk recording apparatus 100.

Of the processing carried out by the host computer 110, the operation performed for recording data is as follows: the host computer 110 sends a control signal directing data recording to the optical disk recording apparatus 100, then sends the data directed by the user to record (audio data or document data) in sequence to the optical disk recording apparatus 100.

Figure 14:
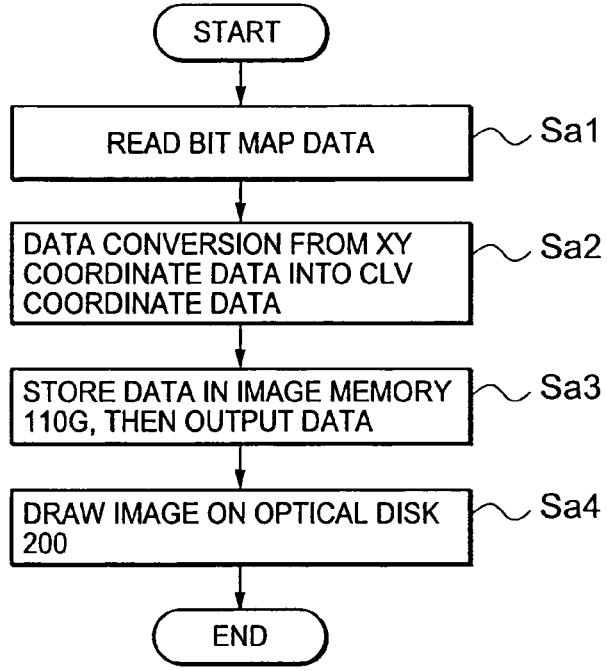
FIG. 14 is a flowchart showing the operation of a host computer in a visible image formation mode.

A detailed description will now be given of the operation performed to form a visible image in the processing implemented by the host computer 110. FIG. 14 is a flowchart illustrating the operation details of the host computer 110 in the visible image formation mode.

First the host computer 110 reads the bit map data for the visible image specified by the user from the image memory (storage) 110G (step Sa1). Then, the host computer 110 carries out data conversion, i.e., the data conversion from xy rectangular coordinate data into CLV coordinate data, on the read bit map data (step Sa2). In the embodiment, it is assumed that the data (bit map data) for the visible image formed on the optical disk 200 has been prepared in the host computer 110. Alternatively, however, desired image data may be prepared through a storage medium, such as a CD-ROM.

Figure 15A:
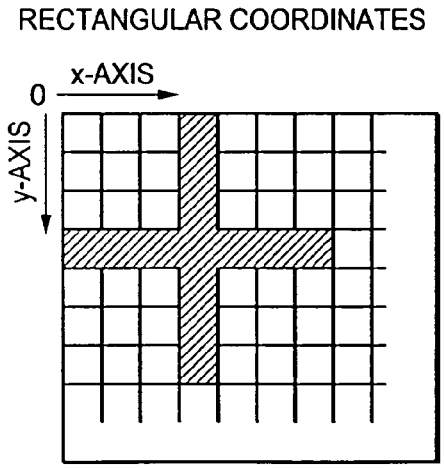
FIGS. 15(a) and 15(b) are schematic diagrams for explaining coordinate conversion processing.
Figure 15B:
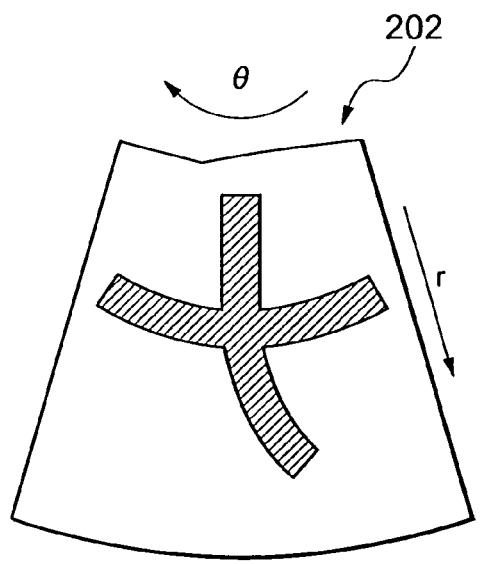

The processing for converting the xy rectangular coordinate data into the CLV coordinate data will be explained. The bit map data for visible images prepared in the host computer 110 uses the xy rectangular coordinates to represent the details of the images, as shown in FIG. 15(a). The example shows the bit map data for a cross figure "+." If the bit map data were used as it is to form the pit 202P on the optical disk 200 that is defined by the CLV coordinates (refer to FIG. 13), the cross figure "+" with a deformed shape would be formed as the visible image, as shown in FIG. 15(b).

Figure 16A:
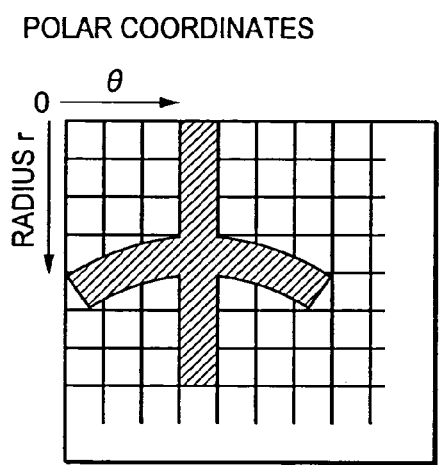
FIGS. 16(a) and 16(b) are schematic diagrams for explaining the coordinate conversion processing.

For the above reason, the host computer 110 converts the rectangular coordinate data into the polar coordinate data, as shown in FIG. 16(a). The polar coordinates use the center of the optical disk 200 as its original point, the r coordinate indicating the radial direction of the disk toward the outer circumference thereof, and the 0 coordinate indicating the clockwise rotational angle in the disk.

In FIG. 16(a), for the convenience of explanation, the coordinates have larger grid gaps, whereas the actual coordinates have finer coordinate gaps to show the dot in each unit region (the same applies to FIG. 17(a), which will be discussed hereinafter).

Figure 16B:
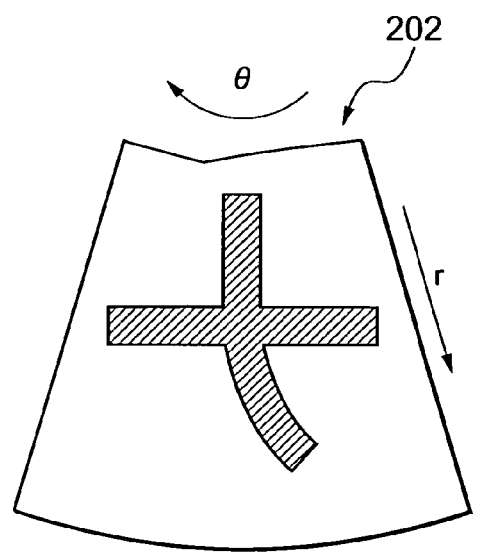

The data converted into the polar coordinate data as described above is used to form the pit 202P on the optical disk 200 that is defined by the CLV coordinates, thus forming the visible image shown in FIG. 16(b). More specifically, in this stage, the horizontal line of the image "+" is adjusted to be a straight line, whereas the vertical line does not become straight. This is because of the properties of the CLV coordinates in which the number of the units regions increases toward the outer circumference of the disk (as the r component increases).

Figure 17A:
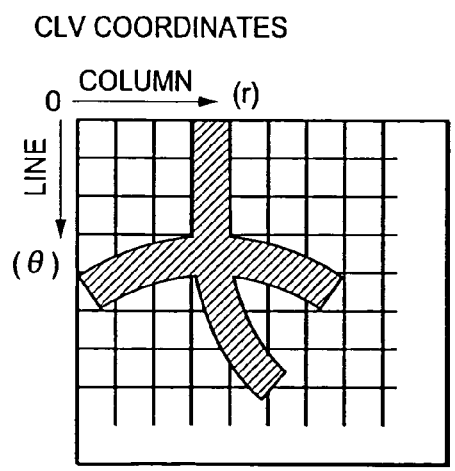
FIGS. 17(a) and 17(b) are schematic diagrams for explaining the coordinate conversion processing.

Therefore, the host computer 110 further converts the data, which has undergone the polar coordinate conversion, into the CLV coordinate data, as shown in FIG. 17(a), considering factors, including the linear velocity of each medium of the optical disk 200, a track pitch, an inner circumference radius.

More specifically, on a particular coordinate value, the host computer 110 performs the conversion such that the θ-direction component in the coordinate value decreases as the redirection component increases.

Figure 17B:
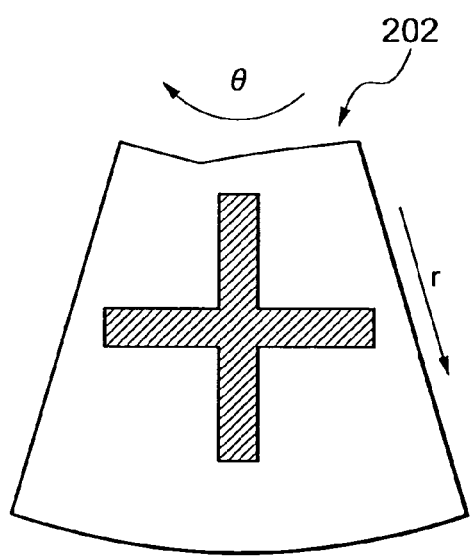

Thus, when the data for the visible image is subjected to the conversion from the rectangular coordinates to the polar coordinates and further to the CLV coordinates, and the pit 202P is formed on the basis of the converted data. As a result, the cross pattern "+" analogous to the one on the rectangular coordinates, as shown in FIG. 17(b), is formed on the optical disk 200.

The host computer 110 supplies the data converted into the CLV coordinate version to optical disk recording apparatus 100, as necessary, or stores the converted data in the image memory 110G before supplying it (step Sa3 in FIG. 14).

Thereafter, the optical disk recording apparatus 100 applies a laser beam onto the optical disk 200 to form the visible image.

<Operation in the Optical Disk Recording Apparatus>

The description will now be given of the operation of the optical disk recording apparatus 100 in the data recording mode. First, when the control signal for starting the recording of data is supplied from the host computer 110, the controller 16 of the optical disk recording apparatus 100 controls the component units of the apparatus to prepare for the data recording. To be more specific, the control is conducted such that the optical disk 200 set by a user is rotatively driven (CLV-driven) and a laser beam is emitted from the optical pickup 10. Meanwhile, the data supplied from the host computer 110 is stored in the buffer memory 29, then converted into the first recording data by the encoder 17 and supplied by the strategy circuit 18 as a strategy signal to the laser driver 19. Thus, the pit 202P is formed according to the strategy signal so as to record the data.

Figure 18:
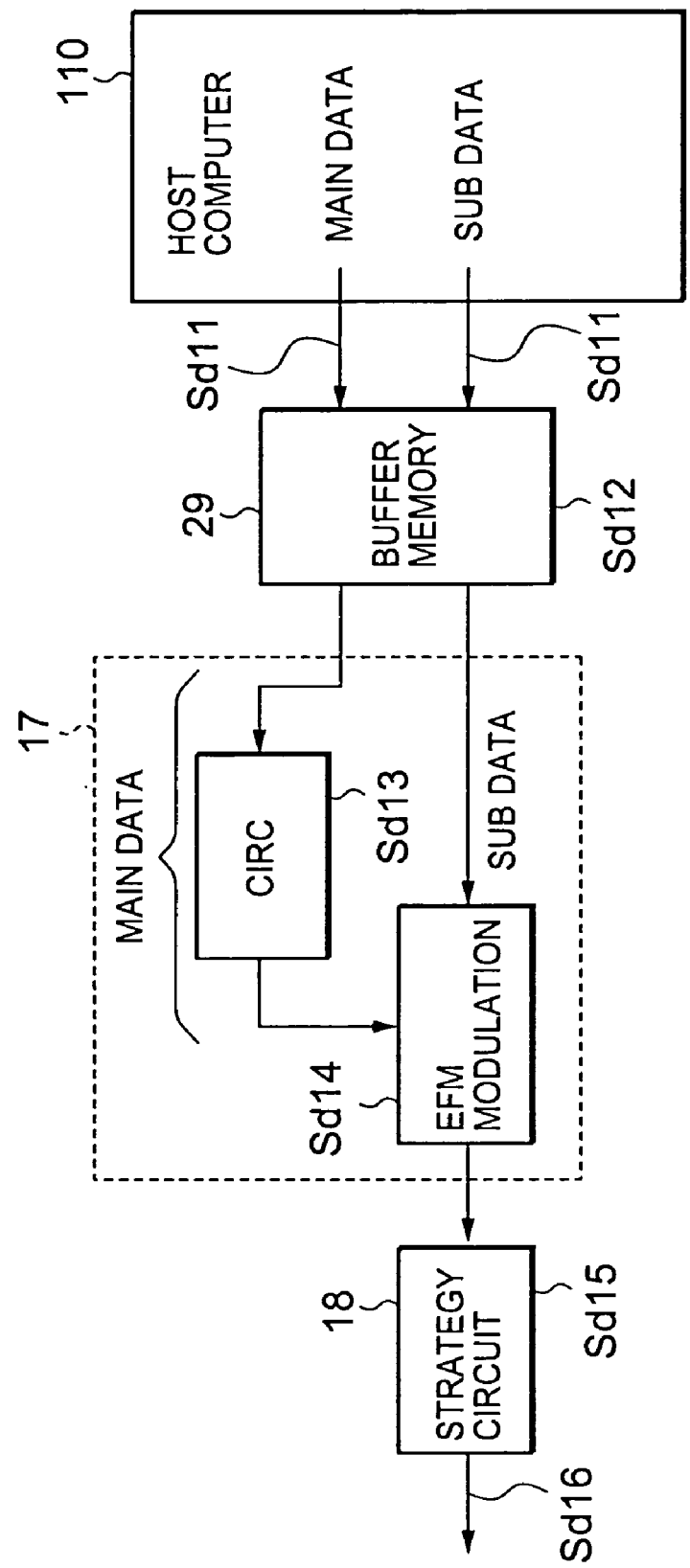
FIG. 18 is a block diagram for explaining the operation of the optical disk recording apparatus in the visible image formation mode.

The recording operation will be explained from the viewpoint of data flow. FIG. 18 illustrates the data flow in the optical disk recording apparatus 100 in the data recording mode.

In the data recording mode, the main data to be recorded and sub data (sub code) are supplied from the host computer 110 to the optical disk recording apparatus 100 (Sd11). The controller 16 stores the supplied main data and sub data once in the buffer memory 29, then reads them out and supplies them to the encoder 17 (Sd12).

The encoder 17 carries out the code error correction encoding (CIRC) on the supplied main data (Sd13). The encoder 17 further carries out the EFM modulation processing on the sub code and the main data, which has been subjected to the code error correction processing, (Sd14), combines them into a frame discussed above, then formats 98 frames into a sub coding frame and supplies the sub coding frame as the first recording data to the strategy circuit 18 (Sd15). The strategy circuit 18 generates a strategy signal from the first recording data supplied from the encoder 17, and supplies the strategy signal to the laser driver 19 (Sd16). Thus, the laser beam is applied onto the optical disk 200 according to the strategy signal to record the data.

Figure 19:
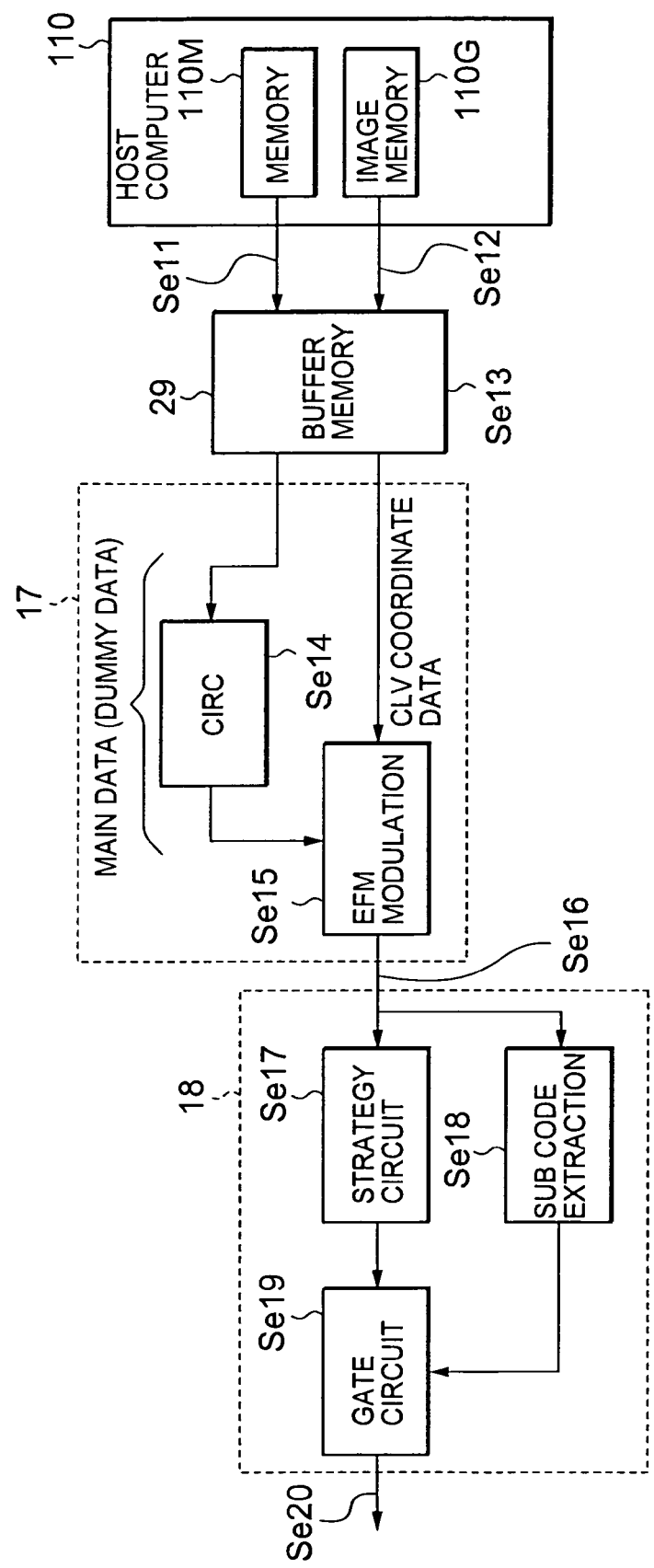
FIG. 19 is a block diagram for explaining the operation of the optical disk recording apparatus in the visible image formation mode.

The operation of the optical disk recording apparatus 100 in the visible image formation mode will now be explained. FIG. 19 illustrates the data flow in the optical disk recording apparatus 100 in the visible image formation mode.

In the visible image formation mode, the optical disk recording apparatus 100 receives dummy data from the memory 110M of the host computer 110 (Se11) and also receives the image data, which has been converted into the CLV coordinate data, from the image memory 110G of the host computer 110 (Se12).

The controller 16 stores the supplied dummy data and image data once in the buffer memory 29, then reads them out and supplies them to the encoder 17 (Se13).

The encoder 17 carries out the same signal processing, namely, the code error correction encoding (CIRC), as that in the data recording mode on the supplied dummy data (Se14). Furthermore, the encoder 17 carries out the EFM modulation processing on the image data and the dummy data, which has been subjected to the code error correction encoding, (Se15), combines them into the aforementioned frame, then formats 98 frames into a sub coding frame and supplies the sub coding frame as the second recording data to the strategy circuit 18 (Se16).

Meanwhile, the strategy circuit 18 identifies the beginning of the frame by the frame synchronous data Dframe, further identifies one block by the synchronous signals S0 and S1, separates the visible image formation data Dx as the sub code data of the block, extracts the gray scale data corresponding to a unit region from the visible image formation data Dx (Se17), and converts the gray scale data into a signal of the pulse width based on the value (Se18). The gray scale data specifies the pit length in the unit region, so that the pulse width will be also based on the pit length.

Then, the strategy circuit 18 generates, as a strategy signal, an AND signal of, for example, the signal having the aforesaid pulse width and a multi-pulse LMP designating the irradiation of a laser beam, and sequentially supplies the strategy signal to the laser driver 19 (Se19).

Thus, a laser beam is applied to the unit region that is on the groove 202G of the optical disk 200 and associated with the gray scale data at the irradiation timing specified by the strategy signal and at the intensity controlled by the laser power control circuit 20. As a result, the operation by which a pit having the length specified by the gray scale data is formed is repeated.

The above operation is repeatedly performed for each frame to form a visible image.

<Operation Timing>

FIG. 20 shows a timing chart of the processing signals in the strategy circuit 18 in the visible image formation mode. In the chart, a signal "/EFMSY" is a negative logic signal indicating the position of the frame synchronous signal Dframe. The period of the signal from the moment the level is switched to L (low) level to the next low level corresponds to the period of one frame.

The signal "EFM" indicates the second recording data. In the second signal, the visible image formation data Dx as the sub code data Dsub is positioned in the part following the frame synchronous data Dframe.

When the strategy circuit 18 extracts the visible image formation data Dx as the sub code data in each frame from frame number "3" to frame number "98" in a certain sub coding frame, the strategy circuit 18 converts the data into a "gray scale PWM" of the pulse width based on the value of the gray scale data contained in the visible image formation data Dx.

In a frame numbered "1" in a sub coding frame, gray scale data PWM 97 obtained in the preceding sub coding frame is converted by the strategy circuit 18 into the "gray scale PWM" of the pulse width based on the value of the gray scale data. In a frame numbered "2," gray scale data PWM 98 obtained in the preceding sub coding frame is converted by the strategy circuit 18 into the "gray scale PWM" of the pulse width based on the value of the gray scale data.

The strategy circuit 18 further generates the AND signal of the "gray scale PWM" and the multi-pulse LMP (not shown in FIG. 20) as a strategy signal LMPO shown in FIG. 20(a).

The gray scale data for one unit region is represented by 7 bits and changes in 128 levels; therefore, it is necessary to adjust the pulse width in the gray scale PWM according to each level. Meanwhile, the unit regions must be disposed at an interval equivalent to one frame in the groove 202G. In the embodiment, therefore, the central timing for adjusting the pulse width is specified, and the pulse width is extended or reduced temporally forward or backward, using the central timing as the reference. This adjusts the center-to-center distance between adjacent pulses in the "gray scale PWM" to the period equivalent to one frame, setting an always constant intervals in the column direction in the unit regions.

On the other hand, if no gray scale data is extracted in a certain frame, then the pulse width of the "gray scale PWM" is not determined. Hence, a relationship is required in which the leading edge of the pulse having a maximum pulse width of the "gray scale PWM" is positioned after the timing at which the gray scale data was extracted. For this reason, as shown in FIG. 20, the pulse of the "gray scale PWM" based on the gray scale data contained in the visible image formation data Dx in a certain frame is converted in the next frame rather than in that frame in this embodiment.

The pulse width may be temporally extended backward from the central timing, or temporally forward as long as the aforementioned relationship is observed.

Depending on the multi-pulse LMP, the strategy signal may be a set of pulses of the same pulse width (refer to FIG. 20(b)), or the "gray scale PWM" may be directly used as the strategy signal (refer to FIG. 20(c)).

According to the optical disk recording apparatus 100, in the construction for recording data onto the optical disk 200

(refer to FIG. 18), visible images can be formed by slightly changing the algorithm of the strategy circuit 18 (refer to FIG. 19).

<Applications and Modifications>

The present invention is not limited to the embodiment described above, and covers various applications and modifications.

(1) In the above embodiment, one unit region in the groove 202G of the optical disk 200 has been allocated to one frame and the pit length has been designated. Alternatively, however, two or more unit regions may be allocated to each frame.

For instance, two unit regions may be allocated to one frame. FIG. 21 shows an example of the visible image formation data Dx in a case where two unit regions are allocated to one frame. In the example shown in the figure, two three-bit gray scale data PWMs (0, 1, 2) are allocated to one frame. Furthermore, unused bits, e.g., bits Cm1 through Cm3, bits Cm4 through Cm 6, bits Cm7 through Cm9, and bits Cm10 through Cm12, are used to constitute four missing gray scale data.

With this arrangement, two unit regions are formed during the period equivalent to one frame, allowing the resolution of the formed visible image to be improved over the one in the above embodiment. Hence, the arrangement is effectively used when the resolution of an image is more important than gray scale representation.

(2) Of the sub code data Dsub, P data and Q data are significant data indicating recording positions on the optical disk 200 and recording time. These P data and Q data may be left intact, and only the regions of the remaining R data, S data . . . . . , W data may be used for embedding visible image formation data.

In this case, it is not required to turn the main data Dmain into dummy data, and data to be recorded may be stored. Specifically, according to this example, drawing data is stored in the sub codes of the R data through the W data, and audio data is stored in the main data, thus making it possible to achieve the configuration wherein two types of data coexist.

FIG. 22 shows the data contents of the visible image formation data Dx in the modification example. According to the modification example, the P data and the Q data remain, so that these data may be used to control the output timing or the like of the strategy signal.

In this example, 5-bit gray scale data PWM is allocated to one frame, permitting 32 levels of gray scale to be used. Furthermore, two missing gray scale data are created by, for example, bits Cm1 through Cm5 and bits Cm6 through Cm10 corresponding to unused R data.

(3) The visible image formation data may be stored in the regions where data other than the sub code data Dsub is stored. For instance, the visible image formation data may be stored in the region wherein a part or all of the main data Dmain is stored. For example, the first byte of the main data Dmain is not interleaved, permitting easy extraction. For the data of the second byte and after, the data may be rearranged in advance, considering the details of the interleave.

In any case, when the information regarding the pit 202P to be formed on the optical disk 200 to produce a visible image is stored as the second recording data, the strategy signal for forming the visible image is generated by the strategy circuit 18 so as to form the visible image on the optical disk 200.

(4) In the above embodiment, for the purpose of easy understanding of the construction of the optical disk recording apparatus 100 (refer to FIG. 1), the encoder 17, the strategy circuit 18, the laser driver 19, and the optical pickup 10 have been explained as separate constituents.

Alternatively, however, some of the constituents may be combined into one assembly. For example, the encoder 17 and the strategy circuit 18 are frequently designed in the form of a single dedicated IC in the actual optical disk recording apparatus 100. Further alternatively, the optical pickup 10 may accommodate the laser driver 19 and the strategy circuit 18.

(5) The optical disk 200 may be rotatively driven at CAV (Constant Angular Velocity) rather than CLV. In this case, the bit map data of the rectangular coordinates may be converted into the one of the polar coordinates (refer to FIG. 15(b)) to generate the second recording data.

(6) In the above embodiment, the processing by encoder 17 and the strategy circuit 18 of the optical disk recording apparatus 100 can be also implemented by a program. Hence, for example, the processing for generating the second recording data or the processing for extracting the visible image formation data Dx included in the second recording data and generating strategy signals may be implemented in a software manner by using programs.

To run a program, the program will be installed in the memory 16M of the controller 16. The program will be installed by, for example, rewriting firmware. Thus, the program may be installed through the intermediary of the host computer 110 or directly installed by setting a CD or the like in which the program has been recorded on the optical disk recording apparatus 100. Further alternatively, the program may be installed over the Internet or the like, i.e., by utilizing the so-called "net distribution."

(7) The optical disk 200 may be, besides the CD-R, other recording medium, including a CD-RW (Compact Disc ReWritable), a data-recordable DVD (Digital Versatile Disc) and Blue Discs. In any case, the present invention can be applied to any optical disk recording apparatus adapted to record data by applying a laser beam to change the reflectivity of partial regions of a disk. The standard (format) for data to be recorded differs from one recording medium to another; however, replacing a part of the data to be processed in the data recording mode by the visible image formation data make it possible to provide the same advantages as those obtained by the above embodiment.

As described above, according to the present invention, it is possible to form visible images with a minimized change of the configuration for recording data onto an optical disk.

What is claimed is:

1. A visible image forming method for forming a visible image on an optical disk by an optical disk recording apparatus, which is designed for applying a laser beam onto an optical disk according to first recording data of a predetermined format to form pits having lengths specified by the first recording data, the method comprising:

a generating step for generating second recording data by embedding image formation data of a visible image in a part of a predetermined format which is the same as predetermined for the first recording data;

an extracting step for extracting the image formation data of the visible image from the second recording data of the predetermined format; and a forming step for forming pits in the optical disk according to the extracted image formation data so as to form the visible image on the optical disk.

2. The visible image forming method according to claim 1, wherein the optical disk has a spiral guiding groove on a recording surface of the optical disk, the spiral guiding groove being divided substantially at an equal interval to define a sequence of regions along the spiral guiding groove, and wherein the image formation data of the visible image specifies the length of the pit to be formed in each region of the spiral guiding groove.

3. The visible image forming method according to claim 2, further comprising a converting step preceding the generating step for converting original image data representing the visual image by rectangular coordinates into the image formation data specifying the length of the pit to be formed in each region of the spiral guiding groove.

4. The visible image forming method according to claim 1, wherein the predetermined format has blocks each having a plurality of frames, each frame having a region for containing main data to be recorded, and wherein the generating step embeds the image formation data of the visible image in a part or whole of the region of each frame.

5. A computer readable medium of an optical disk recording apparatus having a program embodied thereon, said optical disk recording being designed for applying a laser beam onto an optical disk according to first recording data of a predetermined format to form pits having lengths specified by the first recording data, the program being executable for causing the optical disk recording apparatus to perform a method of forming a visible image on an optical disk, said the method comprising:
  a generating step for generating second recording data by embedding image formation data of a visible image in a part of a predetermined format which is the same as predetermined for the first recording data;
  an extracting step for extracting the image formation data of the visible image from the second recording data of the predetermined format; and
  a forming step for forming pits in the optical disk according to the extracted image formation data so as to form the visible image on the optical disk.

6. A visible image forming system for forming a visible image on an optical disk by an optical pickup, which is designed for applying a laser beam onto an optical disk according to first recording data of a predetermined format to form pits having lengths specified by the first recording data, the system comprising:
  a generating section that generates second recording data by embedding image formation data of a visible image in a part of a predetermined format which is the same as predetermined for the first recording data;
  an extracting section that extracts the image formation data of the visible image from the second recording data of the predetermined format; and
  a forming section that operates the optical pickup for forming pits in the optical disk according to the extracted image formation data so as to form the visible image on the optical disk.

7. The visible image forming method according to claim 1, wherein the extracted image formation data represents a pit forming area in which predetermined pits are formed, and the forming step allows pit forming in an optical disk area specified by the pit forming area.

8. The visible image forming method according to claim 1, wherein the extracted image formation data represents a period for which applying of the laser beam onto the optical disk is enabled, and the forming step allows pit forming for the period.

9. The visible image forming method according to claim 8, wherein the forming step has a gate step for outputting the second recording data for the period specified by the extracted image formation data, and a laser driving step for driving an optical pickup in accordance with the outputted second recording data such that the laser beam is applied onto the optical disk.

10. The visible image forming method according to claim 1, wherein the optical disc is controlled by constant angular velocity.

11. The visible image forming method according to claim 1, wherein the optical disc is controlled by constant linear velocity.

12. The visible image forming method according to claim 1, wherein the image formation data is converted from rectangular coordinates to polar coordinates, and thereafter the image formation data of the polar coordinates is embedded in the predetermined format.

13. The visible image forming method according to claim 1, wherein the image formation data is converted from rectangular coordinates to polar coordinates, then the image formation data of the polar coordinates is converted to CLV coordinates, and thereafter the image formation data of the CLV coordinates is embedded in the predetermined format.

14. The visible image forming method according to claim 1, wherein ' the predetermined format is EFM frame data having at least main data and subcode data.

15. The visible image forming method according to claim 1, wherein the predetermined format is Compact Disc standard format.

16. The visible image forming method according to claim 1, wherein the optical disc is Compact Disc.

17. The visible image forming method according to claim 1, wherein the optical disc is DVD disc.

18. The visible image forming method according to claim 1, wherein the predetermined format is the same standard format for data to be recorded on the optical disk.

19. The visible image forming method according to claim 1, wherein the predetermined format has blocks each having a plurality of frames, each frame having a region for containing subcode data to be recorded, and wherein the generating step embeds the image formation data of the visible image in a part or whole of the subcode data.

20. The visible image forming method according to claim 4, wherein the generating step embeds the image formation data of the visible image in a part or whole of the main data.

21. The visible image forming method according to claim 20, wherein the image formation data of the visible image has gray scale data, the gray scale data specifying length of pits formed for each frame of the predetermined format.

22. The visible image forming method according to claim 1, wherein the predetermined format has blocks each having a plurality of frames, each frame having a region for containing subcode data and main data to be recorded, and wherein the generating step embeds the image formation data of the visible image in the region of the subcode data of each frame, and embeds dummy data in the region of the main data of each frame.

23. The visible image forming method according to claim 20, wherein the image formation data is previously rearranged in consideration of an interleave process.

24. The computer readable medium according to claim 5, wherein the extracted image formation data represents a pit forming area in which predetermined pits are formed, and the forming step allows pit forming in an optical disk area specified by the pit forming area.

25. The computer readable medium according to claim 5, wherein the extracted image formation data represents a period for which applying of the laser beam onto the optical disk is enabled, and the forming step allows pit forming for the period.

26. The visible image forming method according to claim 25, wherein the forming step has a gate step for outputting the second recording data for the period specified by the extracted image formation data, and a laser driving step for driving an optical pickup in accordance with the outputted second recording data such that the laser beam is applied onto the optical disk.

27. The computer readable medium according to claim 5, wherein the optical disc is controlled by constant angular velocity.

28. The computer readable medium according to claim 5, wherein the optical disc is controlled by constant linear velocity.

29. The computer readable medium according to claim 5, wherein the image formation data is converted from rectangular coordinates to polar coordinates, and thereafter the image formation data of the polar coordinates is embedded in the predetermined format.

30. The computer readable medium according to claim 5, wherein the image formation data is converted from rectangular coordinates to polar coordinates, then the image formation data of the polar coordinates is converted to CLV coordinates, and thereafter the image formation data of the CLV coordinates is embedded in the predetermined format.

31. The computer readable medium according to claim 5, wherein the predetermined format is EFM frame data having at least main data and subcode data.

32. The computer readable medium according to claim 5, wherein the predetermined format is Compact Disc standard format.

33. The computer readable medium according to claim 5, wherein the optical disc is Compact Disc.

34. The computer readable medium according to claim 5, wherein the optical disc is DVD disc.

35. The computer readable medium according to claim 5, wherein the predetermined format is the same standard format for data to be recorded on the optical disk.

36. The computer readable medium according to claim 5, wherein the predetermined format has blocks each having a plurality of frames, each frame having a region for containing subcode data to be recorded, and wherein the generating step embeds the image formation data of the visible image in a part or whole of the subcode data.

37. The visible image forming method according to claim 5, wherein the generating step embeds the image formation data of the visible image in a part or whole of the main data.

38. The visible image forming method according to claim 37, wherein the image formation data of the visible image has gray scale data, the gray scale data specifying length of pits formed for each frame of the predetermined format.

39. The computer readable medium according to claim 5, wherein the predetermined format has blocks each having a plurality of frames, each frame having a region for containing subcode data and main data to be recorded, and wherein the generating step embeds the image formation data of the visible image in the region of the subcode data of each frame, and embeds dummy data in the region of the main data of each frame.

40. The visible image forming method according to claim 37, wherein the image formation data is previously rearranged in consideration of an interleave process.

41. The visible image forming system of claim 6, wherein the extracted image formation data represents a pit forming area in which predetermined pits are formed, and the forming step allows pit forming in an optical disk area specified by the pit forming area.

42. The visible image forming system of claim 6, wherein the extracted image formation data represents a period for which applying of the laser beam onto the optical disk is enabled, and the forming step allows pit forming for the period.

43. The visible image forming method according to claim 42, wherein the forming section includes a gate for outputting the second recording data for the period specified by the extracted image formation data, and a laser driving section for driving an optical pickup in accordance with the outputted second recording data such that the laser beam is applied onto the optical disk.

44. The visible image forming system of claim 6, wherein the optical disc is controlled by constant angular velocity.

45. The visible image forming system of claim 6, wherein the optical disc is controlled by constant linear velocity.

46. The visible image forming system of claim 6, wherein the image formation data is converted from rectangular coordinates to polar coordinates, and thereafter the image formation data of the polar coordinates is embedded in the predetermined format.

47. The visible image forming system of claim 6, wherein the image formation data is converted from rectangular coordinates to polar coordinates, then the image formation data of the polar coordinates is converted to CLV coordinates, and thereafter the image formation data of the CLV coordinates is embedded in the predetermined format.

48. The visible image forming system of claim 6, wherein the predetermined format is EFM frame data having at least main data and subcode data.

49. The visible image forming system of claim 6, wherein the predetermined format is Compact Disc standard format.

50. The visible image forming system of claim 6, wherein the optical disc is Compact Disc.

51. The visible image forming system of claim 6, wherein the optical disc is DVD disc.

52. The visible image forming system of claim 6, wherein the predetermined format is the same standard format for data to be recorded on the optical disk.

53. The visible image forming system of claim 6, wherein the predetermined format has blocks each having a plurality of frames, each frame having a region for containing subcode data to be recorded, and wherein the generating section embeds the image formation data of the visible image in a part or whole of the subcode data.

54. The visible image forming method according to claim 6, wherein the generating section embeds the image formation data of the visible image in a part or whole of the main data.

55. The visible image forming method according to claim 54, wherein the image formation data of the visible image has gray scale data, the gray scale data specifying length of pits formed for each frame of the predetermined format.

56. The visible image forming system of claim 6, wherein the predetermined format has blocks each having a plurality of frames, each frame having a region for containing subcode data and main data to be recorded, and wherein the generating section embeds the image formation data of the visible image in the region of the subcode data of each frame, and embeds dummy data in the region of the main data of each frame.

57. The visible image forming method according to claim 54, wherein the image formation data is previously rearranged in consideration of an interleave process.

* * * * *